United States Patent [19]

Brown et al.

[11] Patent Number: 4,471,421

[45] Date of Patent: Sep. 11, 1984

[54] MEANS FOR CONTROLLING A FORCED COMMUTATED HYBRID A-C TO D-C ELECTRIC RECTIFYING BRIDGE TO AVOID REVERSE RECOVERY OVERVOLTAGE IN THE DIODE LEG

[75] Inventors: Herbert J. Brown, Erie; Ivan N. Horvat, Monroeville; Ajith K. N. Kumar, Erie, all of Pa.

[73] Assignee: General Electric Company, Erie, Pa.

[21] Appl. No.: 429,728

[22] Filed: Sep. 30, 1982

[51] Int. Cl.³ .................................. H02H 7/125
[52] U.S. Cl. ...................... 363/54; 363/136; 363/68
[58] Field of Search ............ 363/55, 56, 57, 58, 363/135, 136, 137, 52, 53, 54, 128

[56] References Cited

U.S. PATENT DOCUMENTS

| | | | |
|---|---|---|---|
| 3,213,349 | 10/1965 | Gutzwiller | 363/53 |
| 3,392,319 | 7/1968 | McColl et al. | 321/5 |
| 3,849,718 | 11/1974 | Förster et al. | 363/128 |
| 4,181,932 | 1/1980 | Fujiwara | 363/68 |
| 4,306,283 | 12/1981 | Kiwaki et al. | 363/67 |
| 4,377,835 | 3/1983 | Asplund et al. | 363/57 |

Primary Examiner—William M. Shoop
Assistant Examiner—Jeffrey Sterrett
Attorney, Agent, or Firm—Albert S. Richardson, Jr.

[57] ABSTRACT

A hybrid phase-controlled rectifying bridge includes both controlled and uncontrolled electric valves referred to as thyristors and diodes, respectively. Each of a pair of thyristors is periodically fired at an "angle" that can be advanced or retarded as desired, whereupon load current commutates to the thyristor from the corresponding diode. Subsequently the thyristor is turned off at a desired extinction angle by the action of cyclically operative forced commutation means. To avoid reverse recovery overvoltages across a diode when the desired extinction angle is only slightly larger than the firing angle, means is provided for temporarily preventing any turnoff action during the diode-to-thyristor commutation interval and for an additional interval that gives the diode sufficient time to fully recover its reverse blocking capability.

6 Claims, 11 Drawing Figures

MEANS FOR CONTROLLING A FORCED COMMUTATED HYBRID A-C TO D-C ELECTRIC RECTIFYING BRIDGE TO AVOID REVERSE RECOVERY OVERVOLTAGE IN THE DIODE LEG

BACKGROUND OF THE INVENTION

The present invention relates generally to an electric power converter comprising both controlled and uncontrolled electric valves and having forced commutation means for turning off the controlled valves, and it relates more particularly to an improved feature of the controls for a converter well suited to supply direct current (d-c) of variable magnitude to the d-c traction motors on an electric locomotive that is energized from a wayside source of alternating voltage.

Large electrically driven land vehicles such as locomotives and transit cars are propelled by a plurality of traction motors whose rotors are mechanically coupled through speed-reduction gearing to the respective axle-wheel sets of the vehicle. Such motors are usually of the d-c type. If the vehicle is intended to travel along an electrified right of way, it is equipped with a current collector (e.g., a pneumatic or spring-loaded pantograph on the roof of the vehicle) that makes sliding or rolling contact with a bare conductor (e.g., an overhead catenary) extending parallel to the rails or guideway defining the traction vehicle's path of movement. The overhead conductor is part of a power distribution system comprising a source of high-voltage electric power that supplies alternating current (a-c) at a standard frequency such as 60 Hz in the United States or 50 Hz in Europe.

In order to convert the a-c power that is available from the wayside distribution system into direct current of variable magnitude suitable for energizing the armature and field windings of the d-c traction motors on the vehicle, the propulsion system includes a voltage step-down power transformer and a controllable electric power converter. The transformer comprises a single-phase, high-voltage primary winding connected between the current collector and the vehicle wheels (which are at ground potential) and a plurality of lower voltage secondary windings. The converter comprises two or more single-phase, full-wave rectifying bridges. Each bridge has two load-current carrying branches or legs connected in parallel with one another between a pair of output terminals which are connected to at least one of the traction motors, and each leg of the bridge comprises at least one pair of serially connected unilaterally conducting electric valves. A transformer secondary winding is connected across the junctures of the respective valve pairs in the two legs of each bridge, thereby applying alternating voltage to the bridge. The bridge is effective to convert the applied alternating voltage to direct voltage at its output terminals.

The valves in at least one leg of each rectifying bridge in the propulsion system of an electric locomotive are usually uncontrolled devices or simple diodes. In order to vary the output voltage of at least one of the bridges, the other leg of that bridge comprises a pair of serially connected, periodically conducting controllable valves (thereby forming a semi-controlled asymmetrical or "hybrid" rectifying circuit). The average magnitude of the output voltage can then be varied as desired by suitably varying, in synchronism with the applied voltage, the "conduction angles" of such controllable valves (i.e., the lengths of their conducting periods, measured in electrical degrees). During intervals when neither of the controllable valves is in a conducting state, there is no current in the associated secondary winding and motor current will coast or "free-wheel" through a diode leg of the rectifying bridge.

For maximum efficiency the controls of the propulsion system on a vehicle such as an electric locomotive are conventionally designed to work the traction motors at substantially constant horsepower throughout a wide speed range of the locomotive. This is usually done by regulating the magnitude of motor current (and hence motor torque) so that it varies inversely with approximately the square root of locomotive speed as the latter varies between a predetermined "corner point" speed and rated maximum speed. But from zero speed to the corner point speed, maximum current is desired in order to provide high tractive force or effort for accelerating the locomotive from rest. In this low speed range, the voltage applied to the armature windings of the traction motors is relatively low because the counter emf of each motor, which is proportional to speed, is relatively low. At maximum speed maximum voltage must be applied to the motors to overcome their high counter emf, while the magnitude of motor current can now be relatively low because the motors draw less current at high speed than at low speed.

To meet the above-reviewed requirements of both low speed and maximum speed propulsion, it has heretofore been common practice to "stage" the rectifying bridges so that initially, as the locomotive is accelerating from rest, the direct voltage applied to a traction motor is provided by a single bridge (which includes controllable valves) and so that later, when the locomotive attains full speed, the motor voltage is the sum of voltages individually contributed by two or more rectifying bridges whose output terminals are interconnected in series. One well known way to do this is to use at least first and second hybrid bridges in series and to control them in sequence so that during the first stage the conduction angle of each controllable valve in the first bridge is continuously increased from zero to maximum (approximately 180 electrical degrees) while motor current passes through the diode leg(s) of the other bridge(s), thereby increasing the average magnitude of motor voltage from zero to a level equalling the maximum output voltage of the first bridge, whereas during a second stage the conduction angle of each controllable valve in the second bridge is similarly increased while maintaining a maximum conduction angle in the first bridge, thereby further increasing motor voltage to a higher level which equals the maximum output voltage of the first bridge plus the output voltage of the second bridge.

In the present state of the art, the main load-current carrying electric valves in the controllable leg of the hybrid rectifying bridge are high-power, solid-state controllable switching devices known as thyristors or semiconductor controlled rectifiers (SCRs), and the valves in the uncontrolled leg are power rated PN semiconductor diodes having a single rectifying junction. A thyristor is typically a three-electrode PNPN device having an anode, a cathode, and a control or gate terminal. When its anode and cathode are externally connected in series with an electric power load and a source of forward anode voltage (i.e., anode potential is positive with respect to cathode), a thyristor will ordinarily block appreciable load current until a firing or trigger signal is applied to the control terminal, whereupon it switches from its blocking or "off" state to a conducting or "on" state in which the ohmic value of the anode-to-cathode resistance is very low. The time at which the thyristor is turned on, measured in electrical degrees from a cyclically recurring instant at which its anode voltage becomes positive with respect to its cathode at the start of the appropriate half cycle of alternating voltage applied to the bridge, is known as the "firing angle." The average magnitude of the output voltage of a hybrid bridge can be varied by retarding or advancing the firing angle as desired. This is popularly known as "phase control." Hereinafter the firing angle is sometimes also referred to as the "ignition angle."

Once a thyristor is turned on, it can be turned off only by reducing its current below a given holding level and applying a reverse voltage across the anode and cathode for a time period sufficient to allow the thyristor to regain its forward blocking ability. In a conventional line-voltage commutated phase-controlled hybrid bridge, a conducting thyristor is naturally turned off at the end of each half cycle of the applied voltage, at which time the corresponding diode in the parallel diode leg of the bridge becomes forward biased and current transfers from the thyristor to the diode. Such current transfer is referred to as commutation, and the length of the commutation interval (when both the outgoing or relieved thyristor and the incoming or relieving diode are simultaneously conducting) will depend on the magnitude of current being commutated and the inductance (including the leakage reactance of the transformer secondary winding) in the paths of changing current.

Phase-controlled rectifier operation imposes a lagging power factor load on the a-c source. In other words, when the ignition angle of the thyristor leg in a conventional hybrid bridge is delayed or retarded from a fully advanced condition, the fundamental component of alternating current in the transformer primary winding tends to lag the fundamental component of the source voltage, and the locomotive draws undesired reactive or apparent power in addition to useful real power from the wayside distribution system. This is particularly objectionable when the propulsion system is in a high constant horsepower mode and the locomotive is traveling through a region of the electrified right of way that is relatively remote from the nearest wayside substation. To reduce the reactive component of power and consequently to improve the power factor of an electric locomotive (i.e., to obtain a power factor that approaches unity), it has heretofore been proposed to provide means for periodically turning off the main thyristor leg of one of the hybrid rectifying bridges prior to the time at which commutation would otherwise naturally occur. For this purpose, turn off means known as a forced commutation circuit can be used. Such means enables the conducting thyristor to be quenched or turned off at any desired "extinction angle." The extinction angle, which is measured in electrical degrees from the cyclically recurring negative-to-positive zero crossing of the anode voltage on the main thyristor, marks the time at which suitable action is initiated to turn off the main thyristor and thereby extinguish its current. By appropriately controlling both the ignition angle and the extinction angle of the thyristors in one bridge, the average magnitude of the net output voltage that is applied to the traction motors can be varied as desired while the fundamental component of transformer primary current is positioned to remain nearly in phase with the fundamental component of primary voltage.

A typical forced commutation circuit comprises at least one pair of auxiliary thyristors connected in circuit with at least one commutating capacitor across the respective main thyristors of the rectifying bridge so that each main thyristor in turn is forced to turn off by triggering a complementary one of the auxiliary thyristors. In operation, upon turning on the appropriate auxiliary thyristor the voltage on the precharged commutating capacitor is connected across the then conducting main thyristor with reverse polarity, and load current is quickly diverted from the main thyristor to a parallel path provided by the commutating capacitor and auxiliary thyristor. Thus current is transferred or commutated from the main thyristor to the auxiliary thyristor. After its current is reduced to zero, the main thyristor is temporarily reverse biased by the voltage across the discharging commutating capacitor, and it regains its forward blocking ability during this reverse bias or turn off interval. The extinction angle of the main thyristor therefore coincides with the firing of the auxiliary thyristor.

The aforesaid turn off interval ends when the commutating capacitor is fully discharged. Thereafter load current recharges the commutating capacitor with opposite polarity, and forward anode voltage is reapplied to the turned off main thyristor. The capacitor voltage will soon rise to a magnitude exceeding that of the applied alternating voltage, whereupon the difference therebetween forward biases a previously non-conducting diode in the same rectifying bridge. As a result, load current is now commutated or transferred from the auxiliary thyristor to the diode leg of the bridge. Consequently the auxiliary thyristor turns off and the commutating capacitor is left with a charge of proper polarity for subsequently forcing the other main thyristor to turn off when its complementary auxiliary thyristor is triggered during the succeeding half cycle of operation.

The principle of using forced commutation to obtain unity power factor is further explained in prior art U.S. Pat. No. 3,392,319. Various forced commutation circuits are known, as illustrated, for example, by U.S. Pat. Nos. 3,849,718 and 4,181,932. The ability to control the turn off of the main valves in one of the rectifying bridges of an electric locomotive enables the locomotive to be operated at a desirably high power factor. A high power factor results in lower power losses and less voltage droop, thereby reducing the required size and cost of not only the power transformer on board the locomotive but also the transformers and generators in the wayside electric power system. However, designing a locomotive propulsion system using forced commutation to improve its power factor has necessitated finding solutions to several practical problems.

One problem with a hybrid bridge that is provided with forced commutation is the possibility that, if the desired extinction angle were only slightly larger than the ignition angle, the reverse recovery voltage that is generated across a diode could rise to a destructively high magnitude. Reverse recovery voltage is associated with the turn off process of semiconductor valves. At the end of each commutation interval during which load current transfers to the most recently turned on main thyristor from the corresponding diode, the diode is unable to withstand reverse voltage and to block reverse current until a recombination phenomenon takes place in its PN junction. This entails a brief period of reverse current in the diode. As the diode regains its blocking capability, the reverse current rapidly decays to zero and a high reverse recovery voltage is generated. If this voltage exceeds a safe maximum magnitude or peak, it can destroy the diode.

To limit peak reverse recovery voltage, it is common practice to provide a series resistor-capacitor circuit known as a snubber in shunt with each diode. In addition, the amplitude of the reverse recovery current can be desirably reduced by providing a saturable reactor in series with the diode and/or by using a special "fast recovery" diode, but implementing these additional measures to prevent reverse recovery overvoltage increases the cost of the converter. The cost increment could be prohibitively high in a high current converter (such as is used in a high power electric locomotive) where a plurality of diodes are connected in parallel with each other to obtain the requisite high current rating.

SUMMARY OF THE INVENTION

A general objective of the present invention is to provide new and improved means for preventing reverse recovery overvoltages across the diodes in the uncontrolled leg of a hybrid rectifying bridge that incorporates forced commutation means for turning off the main thyristors in the controllable leg of the bridge.

Another objective of the invention is to control a forced commutated hybrid rectifying bridge in a manner that protects the diodes from destructive overvoltages caused by excessive reverse recovery current without requiring large and expensive components in the snubber circuits which are customarily connected across the diodes and without requiring current limiting reactors or fast recovery devices.

In carrying out the invention in one form, an electric load circuit such as a plurality of traction motors on an electric locomotive is supplied with direct current by a converter comprising a rectifying bridge having a pair of d-c output terminals to which the load circuit is connected, at least one pair of diodes serially connected between the output terminals, a-c input terminals adapted to be connected to a source of alternating voltage, means for connecting a first one of the input terminals to the juncture of the diodes, and controllable means for connecting another one of the input terminals to the pair of output terminals. The controllable means include at least one pair of alternately conducting main electric valves having cyclically operative valve turn off means respectively associated therewith. The valve turn off means preferably is a forced commutation circuit comprising at least one pair of auxiliary controlled rectifiers connected, in circuit with at least one precharged commutating capacitor, across the respective main valves, whereby each of the main valves in turn is forced to turn off upon turn on of a complementary one of the auxiliary rectifiers. Turn on control means is provided for generating a set of firing signals capable of periodically turning on the main valves at an ignition angle that can be advanced or retarded as desired, and turn off control means is provided to produce periodic trigger signals for turning on the auxiliary rectifiers so that normally the valves are turned off at a desired extinction angle which varies within predetermined limits.

If the desired extinction angle were only slightly larger than the ignition angle, an auxiliary rectifier could be turned on to initiate forced commutation of the most recently turned on main valve while the transfer of load current to that valve from the corresponding diode in the same bridge is still in process and before the diode has recovered its reverse blocking capability. In this event the rate at which load current decreases in the diode would be substantially increased when the auxiliary rectifier is turned on because the voltage on the commutating capacitor is now applied in series with the source voltage across the diode. As a result, the reverse recovery current in the diode would have an excessively high amplitude, and this can lead to diode failure due to reverse recovery overvoltage. In accordance with the present invention, such an overvoltage condition is avoided by providing means which is effective following each turn on of either one of the main valves for temporarily blocking normal operation of the turn off control means (i.e., for temporarily preventing any turn on of an auxiliary rectifier) until after the corresponding diode has fully recovered its reverse blocking capability. By thus preventing premature operation of the valve turn off means, the diodes are protected from being overstressed by excessive reverse voltage peaks without requiring either the addition of bulky saturable reactors in series with the diodes, or the use of premium-priced fast recovery diodes, or an increase in the number and/or sizes (and costs) of the resistors and capaictors in the snubber circuits that are conventionally connected across the respective diodes, or an increase in the voltage rating (and costs) of the diodes.

The invention will be better understood and its various objects and advantages will be more fully appreciated from the following description taken in conjunction with the accompanying drawings.

DETAILED DESCRIPTION

Figure 1:
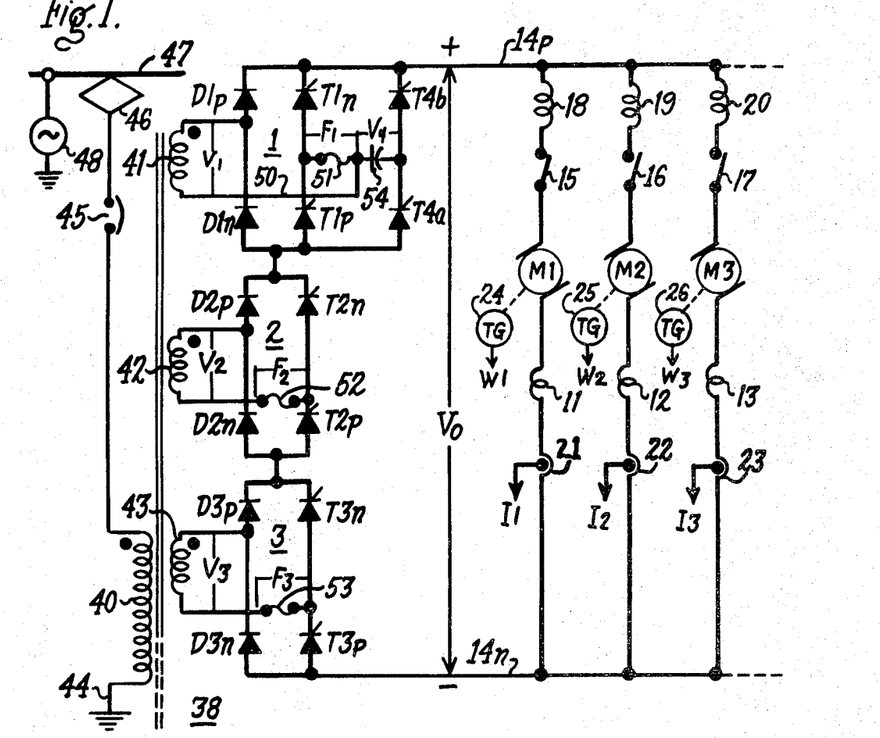
FIG. 1 is a schematic circuit diagram of part of an electric propulsion system on board a vehicle such as an electric locomotive, the illustrated part of the system comprising a single-phase transformer and three serially interconnected hybrid rectifying bridges that convert wayside a-c electric power to d-c power for energizing one group of traction motors on the vehicle, with the first one of the three bridges including controllable turn on and turn off valves.

FIG. 1 depicts an electric propulsion system comprising a group of three d-c traction motors M1, M2, and M3 suitable for propelling or retarding a large traction vehicle such as a locomotive or transit car. Although not shown in the drawings, it will be understood that the rotors of these motors are respectively coupled by speed-reduction gearing to separate axle-wheel sets of one truck of the locomotive. A 3-axle truck has been assumed; only two motors would be used on a 2-axle truck. A second group of three (or two) duplicate motors which are associated with the other truck of the locomotive has been omitted in FIG. 1 for the sake of drawing simplicity.

The motors M1, M2, and M3 are respectively provided with field windings 11, 12, and 13. In the illustrated embodiment of the invention, these field windings are in series with the respective armature windings of the motors whenever the propulsion system is in its motoring mode of operation. The motors are connected in parallel with one another across a pair of relatively positive and negative d-c power conductors 14$p$ and 14$n$, respectively. As is shown in FIG. 1, conventional isolation contactors 15, 16 and 17, current smoothing reactors 18, 19, and 20, and suitable current transducers 21, 22, and 23 are respectively connected in series with the three motors between the d-c conductors. The current transducers 21, 22, and 23 provide signals I1, I2, and I3 proportional to the magnitudes of current in the armatures of the motors M1, M2, and M3, respectively. Three speed sensors 24, 25, and 26 of conventional design are respectively coupled to the rotors of the motors or to the axle-wheel sets of the locomotive truck to provide signals W1, W2, and W3 having frequencies that vary with the angular velocities of the respective motor armatures. Assuming good adhesion between wheels and track, locomotive speed (miles or kilometers per hour) is proportional to motor speed (revolutions per minute). Assuming equal adhesion and equal wheel diameters, the three signals W1, W2, and W3 will have substantially equal values.

Figure 1A:
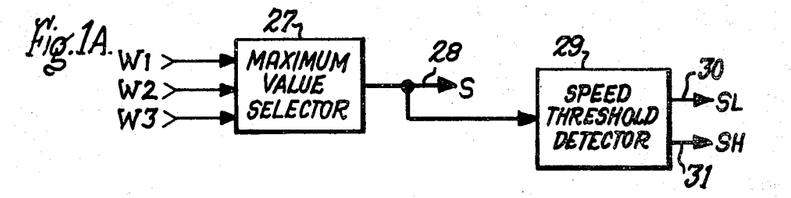
FIGS. 1A and 1B are functional block diagrams of means for providing feedback signals representative of traction motor speed and current, respectively.

As can be seen in Fig. 1A, the signals W1, W2, and W3 from the three speed sensors are fed to a maximum value selector 27 which produces on a line 28 a speed feedback signal S representative of the highest speed of the three motors M1, M2, and M3. The value of S will vary between 0 when the locomotive is at rest and 1.0 per unit when the locomotive is moving at its maximum rated speed (e.g., 75 mph). The speed feedback signal S is supplied to the input of a speed threshold detector 29 which has two output lines 30 and 31. The detector 29 is suitably designed and constructed to produce an output signal SL on the line 30 in response to speed attaining a relatively low threshold (e.g., approximately 0.07 per unit) and to produce an output signal SH on the line 31 in response to speed attaining a predetermined high threshold (e.g., approximately 0.40 per unit). In the illustrated embodiment of the invention, each of the output signals SL and SH is a digital logic signal, i.e., it is low or "0" so long as S has a value indicating that motor speed is lower than the designated threshold, whereas it is high or "1" whenever S indicates motor speed equals or exceeds that threshold.

Figure 1B:
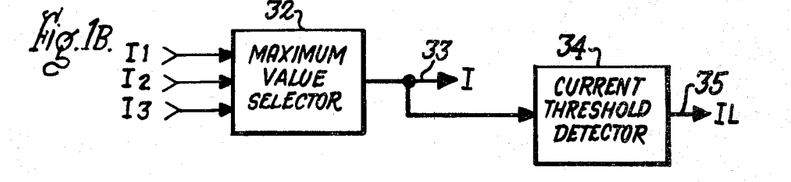

As can be seen in Fig. 1B, the signals I1, I2, and I3 from the three current transducers are fed to a maximum value selector 32 which produces on a line 33 a current feedback signal I representative of the magnitude of direct current in whichever one of the three motors M1, M2, and M3 has the highest current. The current feedback signal I is supplied to the input of a current threshold detector 34 which is suitably designed and constructed to produce an output signal IL on a line 35 in response to the magnitude of motor current attaining a predetermined low level (e.g., 400 amps). The output signal IL is low or "0" so long as I has a value indicating that the magnitude of motor current is lower than such a level, whereas it is high or "1" whenever I indicates motor current equals or exceeds that level.

Returning now to FIG. 1, the d-c power conductors 14$p$ and 14$n$ are coupled to the secondary of a power transformer 38 via an electric power converter comprising three full-wave rectifying circuits 1, 2, and 3. The power transformer has a single-phase primary winding 40 and a plurality of secondary windings, including first, second and third windings 41, 42, and 43, respectively. One terminal of the transformer primary winding 40 is connected to a path 44 at ground potential (e.g., the platform, axles, and wheels of the locomotive and the rails of the track on which the locomotive travels), and the other terminal of winding 40 is connected via the separable main contacts 45 of a power circuit breaker (preferably of the vacuum breaker type) to a suitable current collector 46 on the vehicle (e.g., a pantograph) that maintains sliding contact with an overhead conductor 47 (e.g., a catenary). The catenary 47 is part of a wayside a-c power distribution system that supplies alternating current to the locomotive from a stationary source 48 at substantially constant frequency and relatively high voltage with respect to ground (e.g., 25,000 volts rms at the catenary sections that adjoin wayside power substations). The transformer 38 steps down the source voltage to single-phase alternating voltages V1, V2, and V3 of lower magnitude (e.g., 555 volts rms) on the secondary windings 41, 42, and 43, respectively. These voltages are substantially in phase with one another. While only one set of three secondary windings are shown in FIG. 1, in practice additional secondaries would ordinarily be used.

The three rectifying circuits 1, 2, and 3 shown in FIG. 1 are hybrid or semi-controlled asymmetrical bridges. Each of them has first and second legs connected in parallel with one another between a pair of d-c output terminals. The first leg of each bridge comprises at least one pair of serially connected uncontrolled electric valves D1$p$ and D1$n$, whereas the second leg comprises at least one pair of serially connected, alternately conducting controllable main electric valves T1$n$ and T1$p$. All of these valves are polled to conduct current in a direction from the relatively negative to the relatively positive d-c output terminal. In the presently preferred embodiment of the invention, the uncontrolled valves are solid-state power rectifier diodes, and the controllable valves are solid-state controlled rectifiers or thyristors. While each such device has been shown and described in the singular, in practice it can actually comprise a combination of two or more duplicate devices that are interconnected in parallel (to increase the forward current rating of the leg) and/or in series (to increase the reverse voltage rating).

As can be seen in FIG. 1, the three secondary windings 41, 42, and 43 of the power transformer are respectively connected between the juncture of the diodes D_p and D_n in the first legs of the respective bridges and, via current limiting fuses 51, 52, and 53, respectively, the juncture of the thyristors T_n and T_p in the second legs of the respective bridges, whereby in-phase alternating voltages are respectively applied to corresponding a-c input terminals of the three bridges 1, 2, and 3. The d-c terminal pairs of the bridges are connected in series with one another, whereby the output volt $V_o$ of the converter is the sum of the direct voltages at the individual outputs of the respective bridges 1, 2, and 3. This net output voltage is applied to the load circuit comprising the d-c power conductors 14p and 14n, the armature and series field windings of the parallel array of traction motors M1, M2, and M3, and the reactors 18-20 that are in series with the respective motors. By suitably controlling the thyristor legs of the separate bridges, the average magnitude of $V_o$ can be varied as desired.

Each of the three bridges 1, 2, and 3 includes appropriate means for producing a fault signal F1, F2, or F3 in the abnormal event of a short circuit in the bridge. Such means can comprise, for example, a conventional "trigger" mechanism associated with each of the current limiting fuses 51, 52, and 53 for indicating if and when the current interrupting element of the fuse is ruptured by the overcurrent that will flow in the a-c connections of the bridge if either one of the associated pair of main thyristors were shorted (i.e., if a thyristor were to fail to withstand reverse voltage). Alternatively, the overcurrent signal can simply comprise the voltage that will be present across the terminals of the fuse once its interrupting element has blown.

In order to reduce the amount of reactive power that the illustrated propulsion system draws from the wayside source 48 and thereby to increase the power factor of the locomotive, means for controlling the extinction angle of the main thyristors T1p and T1n in the first bridge 1 is desired. For this purpose these thyristors have cyclically operative valve turn off means respectively associated therewith. In the presently preferred embodiment of the invention, the valve turn off means is a forced commutation subcircuit 4 comprising at least one pair of auxiliary controlled rectifiers T4a and T4b connected in circuit with at least one commutating capacitor 54 across the respective main thyristors T1p and T1n in bridge 1. More specifically, the auxiliary rectifiers are serially connected between the negative and positive output terminals of the bridge 1, and the capacitor 54 spans the juncture of these devices and the juncture of the fuse 51 and a line 50 connecting the fuse 51 to the no-dot end of the transformer secondary winding 41. With this arrangement, during a positive half cycle of the applied voltage V1 (i.e., the half cycle during which the dot end of the secondary winding 41 is positive with respect to the line 50), the main thyristor T1p can be forced to turn off by turning on its complementary auxiliary rectifier T4a, and during a negative half cycle of V1 the main thyristor T1n can be forced to turn off by turning on its complementary auxiliary rectifier T4b. While there are a variety of different forced commutation circuits that are suitable for turning off the main thrysitors in the first bridge, the particular subcircuit 4 that is shown in FIG. 1 is preferred because it is relatively simple and inexpensive. Suitable means (not shown) is provided for precharging the commutating capacitor 54 so that prior to any phase control operation of the rectifying bridge 1 the capacitor voltage V4 has sufficient magnitude for successful commutation.

The operation of the bridge 1 will now be briefly summarized for a typical half cycle during which both ignition and extinction angles of the thyristor leg are controlled. Assume that the commutating capacitor 54 is charged so that the electric potential at the juncture of the rectifiers T4a and T4b is negative with respect to the line 50, and also assume that appreciable load current is flowing through the parallel array of traction motors M1, M2, and M3. At the beginning of a positive half cycle of transformer secondary voltage V1, load current will freewheel through the diode leg D1n, D1p of the bridge 1, there is negligible voltage across the d-c output terminals of this bridge, and V1 is applied as a forward anode-to-cathode bias across the main thyristor T1p which withstands this voltage until its control electrode or gate receives a firing signal at the desired ignition angle. The firing signal turns on T1p, whereupon load current is commutated from diode D1n to thyristor T1p. The rate at which current increases in T1p and decreases in D1n depends on the leakage reactance of the transformer secondary winding 41 and the amount of any other inductance in series with these devices. (While not shown in FIG. 1, it is conventional practice to provide a commutating inductor between the juncture of the main thyristors and the line 50.) During the interval when both D1n and T1p are simultaneously conducting, known as the commutation interval, the voltage applied to the bridge collapses. However, as soon as the diode D1n stops conducting, the voltage on the output terminals of the bridge 1 rises to a magnitude equal to the instantaneous magnitude of the transformer secondary voltage V1, and the output voltage will then remain equal to V1 throughout the remainder of the conduction angle of the thyristor T1p.

Subsequently, at the desired extinction angle, the auxiliary rectifier T4a is turned on and load current will be commutated from T1p to T4a. The current now flowing in T4a initially discharges the commutating capacitor 54 and then recharges it with opposite polarity. The rate of change of capacitor voltage V4 depends on the magnitude of load current. During the capacitor discharging interval, the main thyristor T1p has its current reduced to zero and is then temporarily reverse biased by V4. The period between the time at which forward current in T1p decays to zero and the time at which the capacitor is fully discharged (V4 is zero) is known as the circuit turn off interval, and during this interval T1p regains its forward blocking ability. After the turn off interval, the commutating capacitor recharges and its voltage V4 soon rises to a magnitude exceeding the instantaneous magnitude of V1, whereupon the difference between V4 and V1 forward biases the diode D1n. As a result, load current now quickly commutates from the auxiliary rectifier T4a to the diode D1n, and the capacitor 54 is left with a charge of proper polarity and sufficient magnitude for subsequently forcing the other main thyristor T1n to turn off when its complementary auxiliary rectifier T4b is fired at the desired extinction angle during the succeeding negative half cycle of alternating voltage V1. When T4a turns off, V1 is reapplied to the now turned off main thyristor T1p, and load current again freewheels through the diode leg D1n, D1p of the bridge 1 until the other main thyristor T1n is subsequently turned on, at the desired ignition angle, during the negative half cycle of V1.

Figure 2:
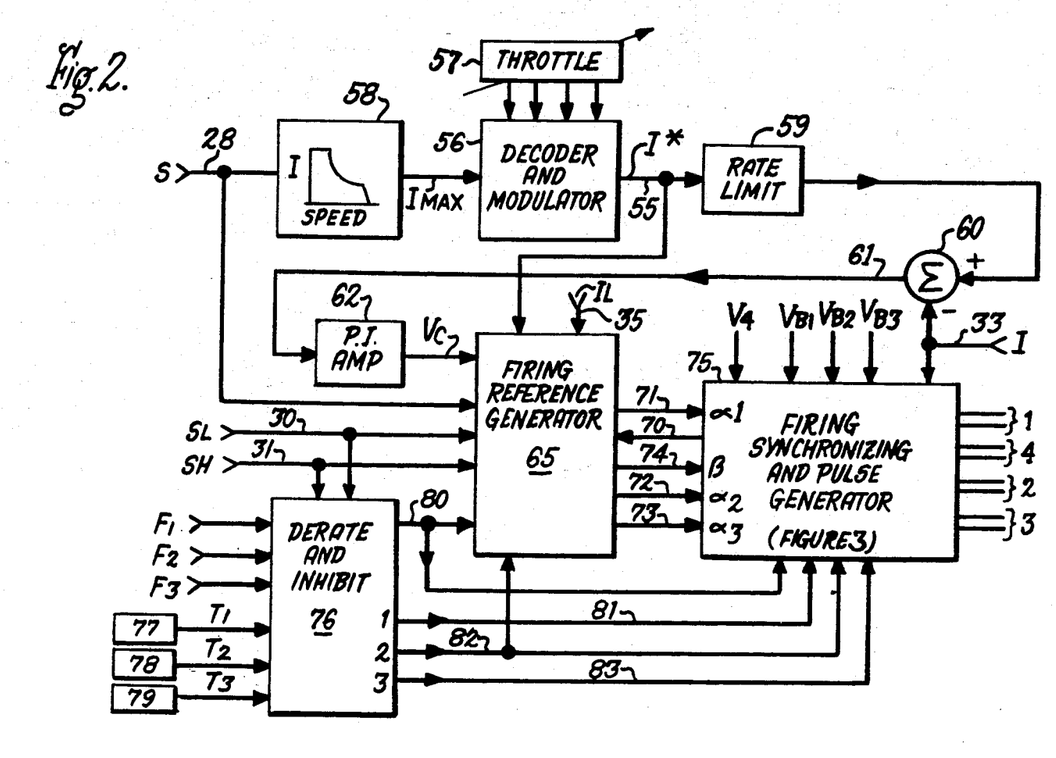
FIG. 2 is a functional block diagram of the controls for the rectifying bridges shown in F1G. 1, which controls include the improvement of the present invention for controlling the turn off of the controllable main valves in the first bridge.

FIG. 2 depicts the controls that provide properly timed firing signals for the gates of the main thyristors in the three rectifying bridges 1, 2, and 3, respectively, and for the gates of the auxiliary controlled rectifiers in the forced commutation subcircuit 4 of the first bridge 1. A conventional closed loop control system is employed, whereby motor current (and hence tractive effort) is regulated to correspond to a desired magnitude. The desired current magnitude is represented by a current call signal I* which is produced on the output line 55 of a block 56 labeled "decoder and modulator." Inputs to this block are provided by an operator controlled throttle 57 and by a motor speed responsive reference generator 58. The reference generator 58 in turn is connected to the speed feedback signal S on line 28. It is suitably constructed and arranged to supply the decoder and modulator 56 with a maximum current signal having a value which varies as a function of motor speed in the manner indicated by the graph drawn inside the block 58. For any motor speed between zero and a predetermined corner point speed (e.g., nearly 30% of the rated maximum motor speed), the maximum current signal has a constant, relatively high value that results in the propulsion system exerting a relatively high tractive effort, but from corner point speed to maximum speed the value of this signal will decrease with the square root of increasing motor speed so that the horsepower of the propulsion system is high and substantially constant.

The value of the maximum current signal is modulated, according to the given setting of the locomotive throttle 57, by the decoder and modulator 56. The handle of the throttle 57 conventionally has an idle position and eight other discrete positions or power notches, and the particular position that the operator has selected is indicated by a system of relays whose contact positions are decoded in the block 56. The throttle setting is herein referred to as a command signal. At any given motor speed, the value of the current call signal I* on line 55 is incrementally increased as the throttle position is advanced from idle to notch 8. Therefore maximum torque is realized in notch 8. The block 56 includes reset means for automatically reducing I* to a value corresponding to zero current when desired.

As is indicated in FIG. 2, the output line 55 of the block 56 is connected to a rate limit circuit 59 whose output supplies a current reference signal to one input of a summing point 60. The rate limit circuit 59 performs the conventional function of preventing the value of the current reference signal from being changed too fast. By way of example, the maximum rate of increase of the reference signal can be limited to a rate corresponding to 150 amps per second. The summing point 60 has another input which is supplied with the current feedback signal I on the line 33, and its output is an error signal which is representative of the difference between actual and desired magnitudes of motor current. Preferably the quiescent value of the error signal (i.e., its value whenever both the desired and actual magnitudes of current are zero) is slightly negative with respect to a predetermined reference potential. The error signal is supplied via a line 61 to a suitable gain network or amplifier 62 having a proportional plus integral transfer characteristic, whereby a zero steady-state error can be obtained. The amplifier 62 produces a control signal $V_c$ which is fed on a line 63 to one of the inputs of a block 65 labeled "firing reference generator." The value of $V_c$ varies, within limits, as a function of any difference or error between the current reference and feedback signals. So long as the error signal is "positive" (i.e., so long as the actual current magnitude is less than desired), the amplifier 62 causes $V_c$ to vary in a sense approaching a predetermined upper limit. The value of $V_c$ determines the ignition angles of the thyristor legs of the respective rectifying bridges 1, 2, and 3, and it will tend to assume whatever value results in reducing the error signal on line 61 to zero. In the illustrated embodiment of the converter controls, $V_c$ is an analog signal, and its magnitude can vary between 0 and +10 volts with respect to the predetermined reference potential. Preferably the reference potential is the same as that of a grounded conductor or bus in the d-c control power circuit.

As is shown in FIG. 2, additional inputs to the firing reference generator 65 are provided by the current call signal I* on line 55, the speed feedback signal S on line 28, the low current signal IL on line 35, and the low and high speed threshold signals SL and SH on lines 30 and 31, respectively. In a manner that is shown and described in a related patent application Ser. No. 429,727 filed concurrently herewith in the names of P. G. Chandran and E. S. Matulevich and assigned to General Electric Company, the firing reference generator 65 generates first, second, third, and fourth reference signals on four output lines 71, 72, 73, and 74, respectively. The first reference signal on line 71 will determine the ignition angle ($\alpha_1$) of the thyristor leg of bridge 1, and normally it is variable from 0 to +10 volts as $V_c$ varies over a first predetermined range of values extending from a first or low limit (e.g., 0 volts) to a preselected first intermediate value (e.g., 3.33 volts). The second reference signal on line 72 will determine the ignition angle ($\alpha_2$) of the thyristor leg of bridge 2, and normally it is variable from 0 to +10 volts as $V_c$ varies over a second predetermined range of values extending from approximately the aforesaid first intermediate value to a preselected second intermediate value (e.g., 6.67 volts) outside of the aforesaid first range. The third reference signal on line 73 will determine the ignition angle ($\alpha_3$) of the thyristor leg of bridge 3, and normally it is variable from 0 to +10 volts as $V_c$ varies over a third predetermined range of values extending from approximately the aforesaid second intermediate value to the aforesaid upper limit (+10 volts). The fourth reference signal on line 74 determines the desired extinction angle ($\beta$) of the thyristor leg of bridge 1, and normally it varies, within predetermined limits, as a predetermined function of motor speed.

The output lines 71-74 of the firing reference generator are coupled to a block 75 labeled "firing synchronizing and pulse generator." Suitable means are provided for supplying the block 75 with signals representative of alternating voltages VB1, VB2, and VB3 applied to the bridges 1, 2, and 3, respectively, and with a signal representative of the voltage V4 across the commutating capacitor 54 in the forced commutation subcircuit 4 that is associated with the thyristor leg of bridge 1. The current feedback signal I on line 33 provides an additional input to the block 75. In a manner that is explained in more detail in conjunction with the description of FIGS. 3 and 4, the firing synchronizing and pulse generator is normally operative to generate first, second, and third sets of periodic firing signals or gate pulses for respectively turning on the pairs of main thyristors in the bridges 1, 2, and 3 in synchronism with the applied voltages at ignition angles that can be advanced or retarded as desired. More particularly, the ignition angle at which the firing signals for bridge 1 are nominally generated will vary from fully retarded to fully advanced as the first reference signal on line 71 varies from 0 to +10 volts, the ignition angle at which the firing signals for bridge 2 are nominally generated will vary from fully retarded to fully advanced as the second reference signal on line 72 varies from 0 to +10 volts, and the ignition angle at which the firing signals for bridge 3 are nominally generated will vary from fully retarded to fully advanced as the third reference signal on line 73 varies from 0 to +10 volts. Thus the three bridges are controlled in sequence. As the control signal $V_c$ increases from its first limit to its upper limit, the average magnitude of the converter output voltage is increased in three stages. With $V_c$ increasing in the aforesaid first range of values, $\alpha_1$ decreases while $\alpha_2$ and $\alpha_3$ remain in their maximum retarded conditions, and $V_o$ equals the output voltage of bridge 1 alone. With $V_c$ increasing in the aforesaid second range, $\alpha_2$ decreases while $\alpha_3$ is fully retarded and $\alpha_1$ is nominally fully advanced, and $V_o$ equals the sum of the output voltage of bridges 1 and 2. Finally, with the value of $V_c$ increasing in the third range, $\alpha_3$ decreases while $\alpha_2$ and $\alpha_1$ are in maximum advanced conditions, and $V_o$ now equals the sum of output voltages from all three bridges.

Figure 5:
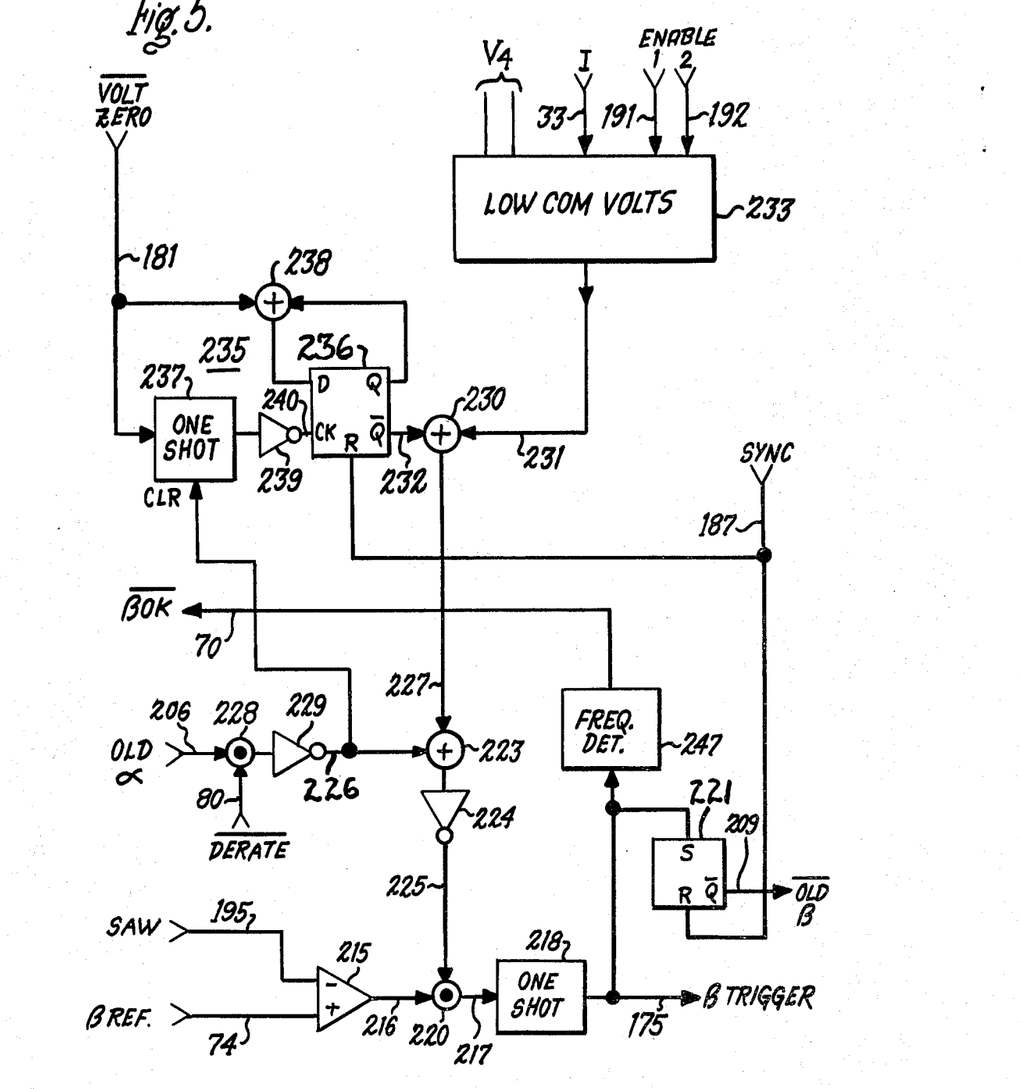
FIG. 5 is a schematic diagram of the "β logic" circuit shown as a single block in FIG. 3, the output of this circuit comprising β trigger signals which periodically activate the turn off gate pulse generator block labeled "#4 GPG" in FIG. 3.

As will be better understood from the description of FIG. 5, the firing synchronizing and pulse generator 75 is also operative to generate firing signals or gate pulses for the auxiliary controlled rectifiers in the forced commutation subcircuit 4 so that normally the main thyristors in bridge 1 are periodically turned off in synchronism with the voltage VB1 at an extinction angle determined by the magnitude of the fourth reference signal on line 74. In this manner the fundamental component of current in the transformer primary 40 is shifted to be more nearly in phase with the fundamental component of primary voltage, whereby the power factor of the locomotive propulsion system is improved.

Normal operation of the firing reference generator 65 and of the companion firing synchronizing and pulse generator 75 is sometimes prevented by the action of a block 76 labeled "derate and inhibit." Inputs to the block 75 are provided by the speed threshold signals SL and SH on lines 30 and 31, respectively, by the thyristor overcurrent signals F1, F2, and F3 and, if desired, by three transformer winding overcurrent signals T1, T2, and T3 which are received from blocks 77, 78, and 79, respectively. The blocks 77–79 represent conventional instantaneous overcurrent protective relays which are respectively coupled, by means of current transformers (not shown), to the secondary windings 41–43 of the power transformer 38, and each of them is effective to produce a signal T1, T2, or T3 in response to abnormally high transformer secondary current caused by the failure of any one of the valves in the diode leg of the associated bridge 1, 2, or 3.

As is shown in FIG. 2, the derate and inhibit block 76 has four output lines 80 through 83 connected to the block 75, and two of these lines (80 and 82) are also connected to the block 65. The block 76 includes logic circuits suitably arranged to produce a derate signal on the output line 80 and inhibit signals on the respective lines 81, 82, and 83 in response to various combinations of the signals that are received at its inputs. The construction and operation of such logic circuits are more fully described and are claimed in the patent application Ser. No. 429,729 filed concurrently herewith in the name of Edward S. Matulevich and assigned to General Electric Company. Briefly summarized, the circuits in block 76 are effective to produce:

(1) a first inhibit signal on the line 81 for preventing the generation of the first set of firing signals for bridge 1 in the event of an overcurrent signal F1 or T1 (indicating a bridge 1 fault);

(2) a second inhibit signal on the line 82 for preventing the generation of the second set of firing signals for bridge 2 and for adjusting the firing reference generator 65 so that the third reference signal on line 73 varies between 0 and +10 volts as the control signal $V_c$ varies over its second range of values (a) in the event of an overcurrent signal F2 or T2 (indicating a bridge 2 fault) or (b) whenever there is no bridge 1 fault, and motor speed is lower than the aforesaid low threshold (as indicated by the signal SL being "0");

(3) a derate signal on the line 80 for inhibiting the firing signals for the auxiliary rectifiers in the forced commutation subcircuit 4, for imposing a predetermined minimum limit on $\alpha_1$ (unless the magnitude of load current is lower than the aforesaid low level, as indicated by the signal IL being "0"), and for imposing the same minimum limit on $\alpha_3$ in the event of a fault in either bridge 1 or bridge 2; and (4) a third inhibit signal on the line 83 for preventing the generation of the third set of firing signals for the bridge 3 whenever (a) there are no overcurrent signals, and motor speed is lower than the aforesaid high threshold (as indicated by the signal SH being "0"), or (b) there is an overcurrent signal F3 or T3 (indicating a bridge 3 fault), or (c) there is a fault in bridge 1 or 2 but not in bridge 3, and motor speed is lower than its predetermined low threshold.

Figure 3:
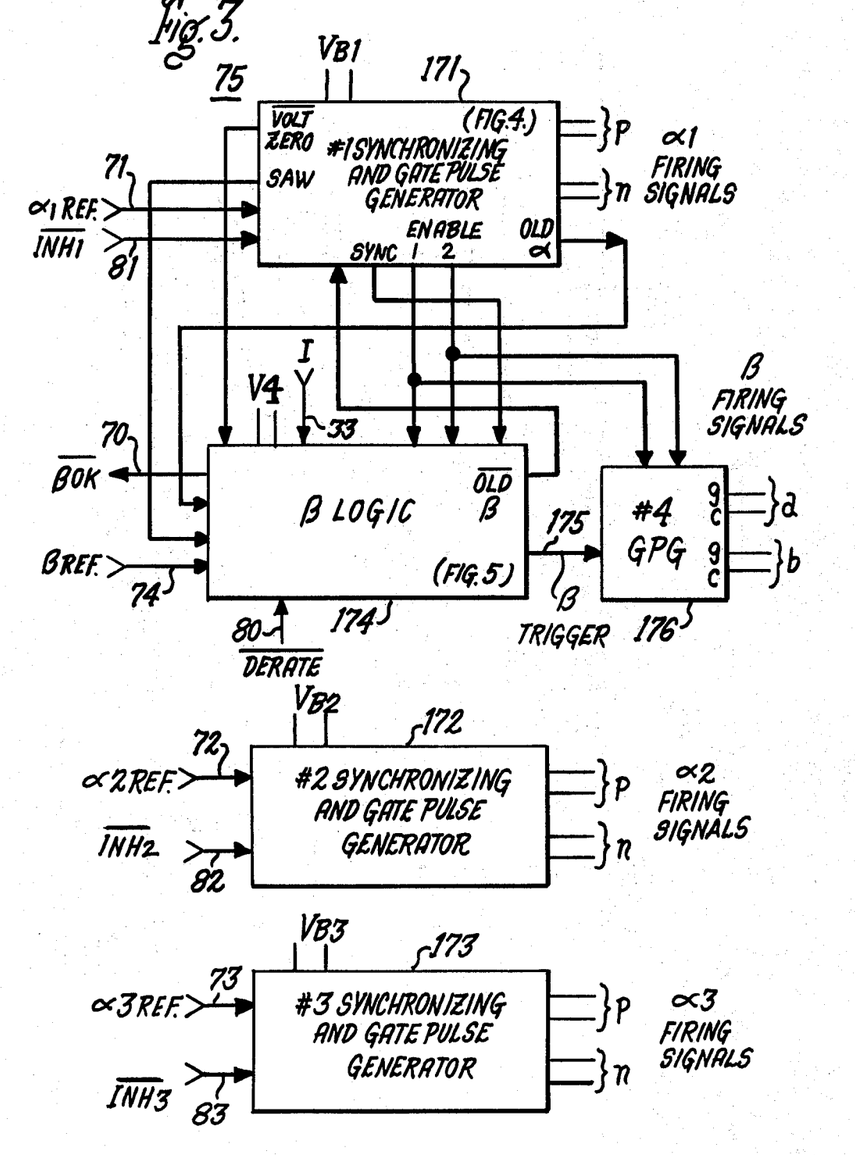
FIG. 3 is an expanded functional block diagram of the firing synchronizing and pulse generator block of FIG. 2.

As is shown in FIG. 3, the firing synchronizing and pulse generator 75 actually comprises three separate synchronizing and gate pulse generators 171, 172 and 173 which, at ignition angles that are respectively determined by the values of the first, second and third reference signals on line 71, 72 and 73, generate the first, second, and third sets of periodic firing signals that are coupled to the gates of the main thyristors $T_p$ and $T_n$ in the bridges 1, 2 and 3, respectively. It also comprises a block 174 labeled "$\beta$ logic" that is fed by the fourth reference signal ($\beta$ REF) on line 74 and that is interconnected with the #1 generator 171. The block 174 is suitably constructed and arranged to produce periodic trigger signals which are fed over a line 175 to a block 176 labeled "#4 GPG." In response to the trigger signals on line 175 and to steering signals received from "enable" 1 and 2 outputs of the generator 171, the block 176 generates firing signals that are coupled to the gates of the auxiliary controlled rectifers T4a and T4b in the forced commutation subcircuit, which signals in effect are turn off signals for the pair of main thyristors in bridge 1. Circuit details of the presently preferred embodiment of the #1 synchronizing and gate pulse generator 171 are shown in FIG. 4, and circuit details of the presently preferred embodiment of the $\beta$ logic block 174 are shown in FIG. 5.

Figure 4:
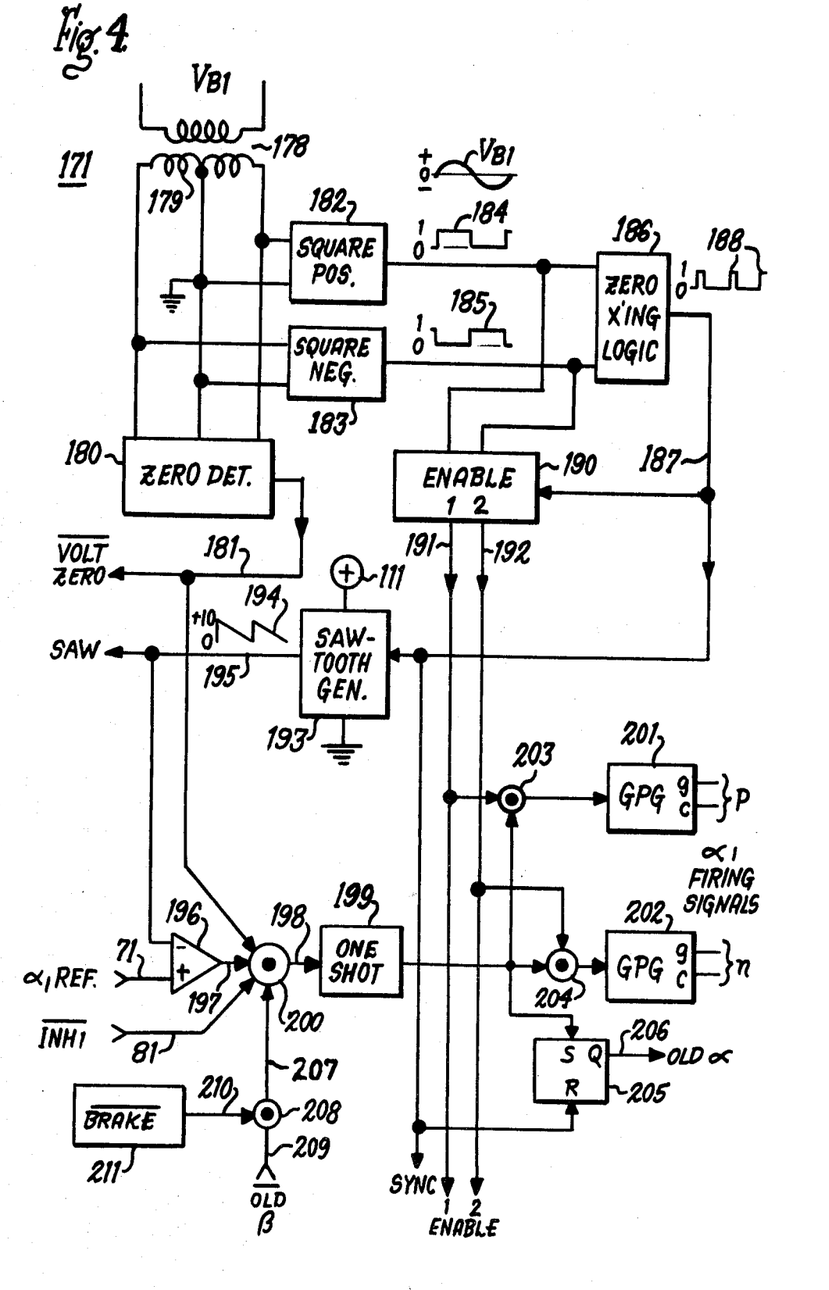
FIG. 4 is schematic diagram of the #1 sychronizing and gate pulse generator circuit shown as a single block in FIG. 3, the output of this circuit comprising a first set of firing signals for the pair of main valves in the first bridge.

As can be seen in FIG. 4, one input of the #1 generator 171 is supplied with the first reference signal ($\alpha_1$ REF) on line 71, and another input receives a signal VB1 representative of the alternating voltage applied to bridge 1 (i.e., the voltage between the respective junctures of the diodes D1p and D1n and of the main thyristors T1p and T1n). The latter signal energizes the primary of a single-phase instrument transformer 178 having a center-tapped secondary winding 179 which is connected to bistable voltage detecting means 180 and which is also connected to squaring means comprising two blocks 182 and 183 which are respectively labeled "square pos." and "square neg." The purpose of the voltage detecting means 180 is to indicate when VB1 is zero; it has a "0" output state whenever the magnitude of VB1 is negligible and a "1" output state whenever the magnitude of VB1 is appreciable. More specifically, the signal "volt zero" on the output line 181 of the detector 180 is 1 only if and when the instantaneous magnitude of the alternating voltage applied to bridge 1 equals or exceeds a predetermined low level. Preferably this "pick up" level of the detector 180 is approximately 25 percent of the peak magnitude of V1 under a full voltage condition when the locomotive is adjacent to a wayside substation.

During each "positive" half cycle of VB1 the squaring means is operative to produce a "1" digital logic signal 184 at the output of the block 182, and during each "negative" half cycle of VB1 a "1" signal 185 is produced at the output of the block 183. The squared signals 184 and 185 are supplied to a zero crossing logic circuit 186 which is suitably constructed and arranged to produce, on its output line 187, a train of synchronizing signals or sync pulses 188 that are "1" for relatively short, constant periods of time precisely coinciding with successive zero crossings of VB1. The signals 184, 185, and 188 are supplied to inputs of a block 190 labeled "enable," which block has two output lines 191 and 192. The purpose of this component is to correct any asymmetry that may exist in the squared signals 184 and 185. It is suitably constructed and arranged to provide a "1" steering or enable signal on line 191 that is concurrent with each positive half cycle of VB1 and alternately to provide a "1" steering or enable signal on line 192 that is concurrent with each negative half cycle of VB1.

The circuits illustrated in FIG. 4 also include suitable means responsive to the sync pulses 188 on line 187 for providing a timing signal that is coordinated with the zero crossings of VB1. Preferably the timing signal is provided by a conventional saw-tooth generator 193 connected between a relatively positive d-c control power terminal 111 and ground. This component generates a saw-tooth voltage wave in synchronism with VB1. More particularly, the ouput of the generator 193 is an analog signal 194 the value of which increases abruptly to +10 volts in response to each sync pulse and then decreases at a constant rate that results in the signal 194 falling from +10 volts to 0 in a half period of VB1. The saw-tooth voltage signal 194 is fed via the output line 195 of the generator 193 to the negative input of a comparator 196 whose positive input comprises the reference signal on line 71. Consequently the signal on the output line 197 of the comparator 196 will change from 1 to 0 when the saw-tooth signal rises to +10 volts at the start of each half cycle, and subsequently it will change from 0 to 1 each time a falling saw-tooth signal intersects the first reference signal, i.e., at the instant when the value of the saw-tooth signal just equals the value of the reference signal. So long as the first reference signal on line 71 is positive, the lower its magnitude the later the signal on line 197 changes from 0 to 1 in each half cycle of VB1. As the reference signal approaches 0, the 0-to-1 change on line 197 occurs at an electrical angle approaching 180 degrees. If the reference signal were negative, the signal on line 197 would remain 0.

The output line 197 from the comparator 196 is coupled to the input line 198 of a conventional monostable multivibrator 199 (which is shown as a block labeled "one shot") by way of suitable AND logic means 200 (shown symbolically in FIG. 4 by an encircled dot having four inputs). The one shot block 199 is operative in response to each 0-to-1 change of the signal on its input line to produce at its output a brief "1" signal or $\alpha$ trigger pulse of fixed duration (e.g., 15 microseconds). Consecutive trigger pulses from the block 199 will alternately activate a pair of gate pulse generators 201 and 202, depending on which one of these generators is "enabled" by a steering signal from the enable block 190. Throughout a positive half cycle of VB1, the "1" signal on line 191 is supplied to one input of an AND logic circuit 203 which therefore passes the trigger pulse from the one shot 199 to the first gate pulse generator 201, whereas throughout a negative half cycle of VB1, the "1" signal on line 192 is supplied to one input of another AND logic circuit 204 which therefore passes the trigger pulse from the one shot 199 to the second gate pulse generator 202. When the generator 201 is activated by an $\alpha$ trigger pulse, it transmits an appropriate firing signal to the gate electrode and cathode of the main thyristor T1p in bridge 1, and when the generator 202 is activated by the next $\alpha$ trigger pulse, it will transmit an appropriate firing signal to the gate electrode and cathode of the main thyristor T1n in bridge 1. Thus the #1 generator 171 nominally generates the first set of firing signals at an ignition angle $\alpha_1$ which coincides with the angle (measured in electrical degrees from the start of each half cycle of VB1) of the 0-to-1 change of the comparator output signal on line 197.

The trigger pulses produced at the output of the one shot 199 are also fed to a "set" input of a conventional bistable flip flop device 205. This device has a "reset" input connected to the sync pulse line 187 and a "Q" output connected to an output line 206, whereby a 1 signal (referred to as "old $\alpha$") is provided on the line 206 except during recurrent intervals that commence at each zero crossing of VB1, as indicated by a sync pulse 188 on line 187, and that terminate with the next generation of an $\alpha_1$ firing signal. The output line 206 is connected to the $\beta$ logic circuit 174 where, in a manner that will soon be explained in conjunction with the description of FIG. 5, a 0 signal on this line is effective to prevent any production of a $\beta$ trigger signal on line 175 prior to an $\alpha$ trigger pulse being produced by the one shot 199 during each half cycle of VB1.

The AND logic means 200 will prevent the one shot device 199 from responding normally to a 0-to-1 change of the comparator output signal on line 197 if any one of the signals supplied to its various inputs is 0. So long as any 0 signal is being supplied to the logic means 200, the signal on line 198 will remain 0 and the device 199 cannot produce any $\alpha_1$ trigger pulse. This inhibits the first set of firing signals and consequently blocks the thyristor turn on operation of the #1 generator 171. As is shown in FIG. 4, one of the input signals to the logic means 200 comprises the first inhibit signal (INH1) on line 81. In normal operation INH1 is 1, but it will change to 0 when the derate and inhibit block 76 (FIG.

2) detects a bridge 1 fault, in which event normal operation of the one shot 199 will be prevented.

Another input to the logic means 200 comprises the volt zero signal on line 181. This signal is 0 whenever the instantaneous magnitude of alternating voltage applied to bridge 1 is lower than the aforesaid predetermined low level, as is true if the power transformer primary winding 40 is deenergized (e.g., when the pantograph 46 of the locomotive is traversing a phase break in the catenary 47), during commutation notches (i.e., during the commutation interval following the firing of each of the main thyristors in bridge 1), and immediately before and after each zero crossing of VB1. It will now be apparent that the selection of the pickup level of the zero voltage detector 180 determines minimum and maximum limits of $\alpha_1$ when $\alpha_1$ REF is near 0 volts or +10 volts. For example, assuming that the pickup level is 25 percent of the peak magnitude of V1 at full line voltage, the $\alpha_1$ firing signals cannot be actually generated at an ignition angle more advanced than approximately 15° or more retarded than approximately 165°. Such limits are desirable because they prevent any attempt to fire a main thyristor when the magnitude of its annode-to-cathode voltage is too low to ensure successful turn on.

Yet another input to the logic means 200 is provided over a line 207 from the output of a companion AND logic circuit 208 having two input lines 209 and 210. The signal on line 207 is 1 whenever the signals on both lines 209 and 210 are concurrently 1, and otherwise it is 0. The line 209 is connected to the $\beta$ logic circuit 174 (FIG. 5) where it receives a 0 signal only during recurrent intervals that commence with the generation of a $\beta$ firing signal during each positive or negative half cycle of VB1 and that terminate at the end of the half cycle. The line 210 is connected to a block 211 (labeled "brake" in FIG. 4) which normally produces a 1 output signal but which is suitably constructed and arranged to change its output signal to 0 when the locomotive is operating in a braking mode rather than a motoring mode.

As is shown in FIG. 3, the #1 synchronizing and gate pulse generator 171 (FIG. 4) is interconnected with the $\beta$ logic circuit 174. The latter circuit will now be described with reference to FIG. 5. It includes a comparator 215 having two inputs. The saw-tooth voltage signal (194) from the #1 generator 171 is fed via line 195 to the negative input of this comparator, and the fourth reference signal ($\beta$ REF) on line 74 from the firing reference generator 65 is fed to the positive input of the comparator 215. Consequently the signal on the output line 216 of the comparator will change from 0 to 1 each time a falling saw tooth signal on line 195 intersects a reference signal of positive magnitude on line 74. The line 216 is coupled to the input line 217 of a monostable multivibrator (one shot) 218 via AND logic means 220 shown symbolically in FIG. 5 by an encircled dot having multiple inputs. The output of the one shot device 218 appears on the output line 175 of the $\beta$ logic circuit, and this device is operative periodically, in response to successive 0-to-1 changes of the signal on its input line 217, to produce a train of discrete $\beta$ trigger signals on the line 175. These trigger signals are supplied to the #4 gate pulse generator 176 (FIG. 3) which comprises suitable means, including logic circuits similar to those shown at 203 and 204 in FIG. 4, for alternately transmitting appropriate firing signals to the respective auxiliary controlled rectifiers in the forced commutation subcircuit 4 in response to consecutive signals on line 175. As a result, the turn off action of each of the main thyristors T1$p$ and T1$n$ in bridge 1 is initiated at an extinction angle $\beta$ that nominally coincides with the "angle" of the 0-to-1 change of the comparator output signal on line 216. It will now be apparent that the lower the value of $\beta$ REF the later this change occurs in each half cycle of applied voltage (VB1), and hence the desired $\beta$ varies inversely with the value of $\beta$ REF. When certain disabling means in the reference generator 65 are not effective to keep $\beta$ REF at a negative value, this signal has a positive magnitude that decreases with increasing motor speed up to a predetermined speed threshold at which $\beta$ is clamped at a maximum limit (e.g., 95°), all as is explained more fully in the above-mentioned concurrently filed application of Chandran and Matulevich.

The trigger signals on output line 175 are also fed to a "set" input of a flip flop device 221 which has a "reset" input connected to the sync pulse line 187 and a "Q bar" output connected to the line 209. The output signal of this device is 1 except during the aforesaid recurring intervals commencing with the production of each $\beta$ trigger signal and terminating at the next sync pulse (188) on line 187 (which marks the end of either a positive or negative half cycle of the alternating voltage applied to bridge 1). The line 209 is coupled in the #1 generator (FIG. 4) to the input line 207 of the logic means 200, and once a $\beta$ trigger signal is produced on line 175 the resulting 0 signal on line 209 is effective to inhibit another $\alpha_1$ firing signal until the next half cycle.

The AND logic means 220 will prevent the one shot device 218 from responding normally to a 0-to-1 change of the comparator output signal on line 216 if the signal supplied to its second input is 0. So long as any 0 signal is being supplied to the logic means 220, the signal on line 217 will remain 0 and the device 218 cannot produce any $\beta$ trigger signals on line 175. This inhibits the firing signals for the auxiliary rectifiers in the forced commutation subcircuit 4 and consequently blocks the thyristor turn off operation of the converter controls.

The second input signal supplied to the logic means 220 comprises the inverted output signal of a conventional OR logic circuit 223 shown symbolically in FIG. 5 by an encircled plus sign. The output of this circuit is connected to an input of the logic means 220 via a signal inverter 224 and a line 225. The signal on line 225 is 0 so long as there is a 1 signal on either of the two input lines 226 and 227 of the circuit 223, and it is 1 only when the signals on both input lines are concurrently 0. The first input line 226 is supplied with the inverted output signal of an AND logic circuit 228 to which it is connected via a signal inverter 229. The two inputs of the latter circuit are connected to the lines 80 and 206, respectively. The output signal of the logic circuit 228 will be 0 (and the signal on line 226 will therefore be 1) so long as there is a 0 signal on either line 80 or line 206; otherwise it is 1. As a result, a 0 signal is maintained on the input line 225 of the logic means 220 and normal operation of the one shot 218 is prevented whenever the derate signal on line 80 is 0 (as is the case when the derate and inhibit block 76 detects a fault in either bridge 1 or bridge 2) or whenever the old $\alpha$ signal on line 206 is 0 (as is true during the aforesaid recurrent intervals commencing at the start of each half cycle of the alternating voltage applied to the a-c terminals of bridge 1 and terminating in response to the next turn on of thyristor T1$p$ or T1$n$ in the same bridge).

The second input line 227 to the OR logic circuit 223 is supplied with the output signal of a companion OR logic circuit 230 having two input lines 231 and 232. As can be seen in Fig. 5, line 231 is connected to the ouput of a block 233 labeled "low com volts" which in turn receives as inputs the current feedback signal I on line 33, a signal representative of the voltage V4 across the commutating capacitor 54, and the enable 1 and 2 signals on lines 191 and 192, respectively. The purpose of the component 233 is to block or inhibit the normal thyristor turn off operation of the β logic circuit 174 by providing a 1 signal on line 231 (and hence a 0 signal on line 225) anytime the magnitude of V4 is insufficient to ensure successful forced commutation of the load current being conducted by the main thyristors in bridge 1. The circuit details, operation, and advantages of such a component are disclosed and claimed in a copending patent application Ser. No. 454,207 filed Dec. 29, 1982 in the names of H. J. Brown, A. K. Kumar, and E. S. Matulevich and assigned to General Electric Company.

The second input line 232 to the OR logic circuit 230 is connected to the ouput of a time delay circuit 235 which in turn receives as inputs the volt zero signal on line 181, the sync pulses (188) on line 187, and the inverted old α signal on line 226. In accordance with the present invention, the circuit 235 is operative when the main thyristors in bridge 1 are fired to provide a 1 signal on line 232 (and hence a 0 signal on line 225) so as temporarily to extend the aforesaid recurrent intervals during which normal thyristor turn off operation of the β logic circuit is blocked, whereby each of the diodes D1p and D1n in bridge 1 has sufficient time to fully recover its reverse blocking capability after load current is commutated to the corresponding main thyristor before the complementary auxiliary rectifier can be fired. The purpose and advantage of this feature will be more clearly appreciated from the following description of FIGS. 6 and 7.

Figure 6:
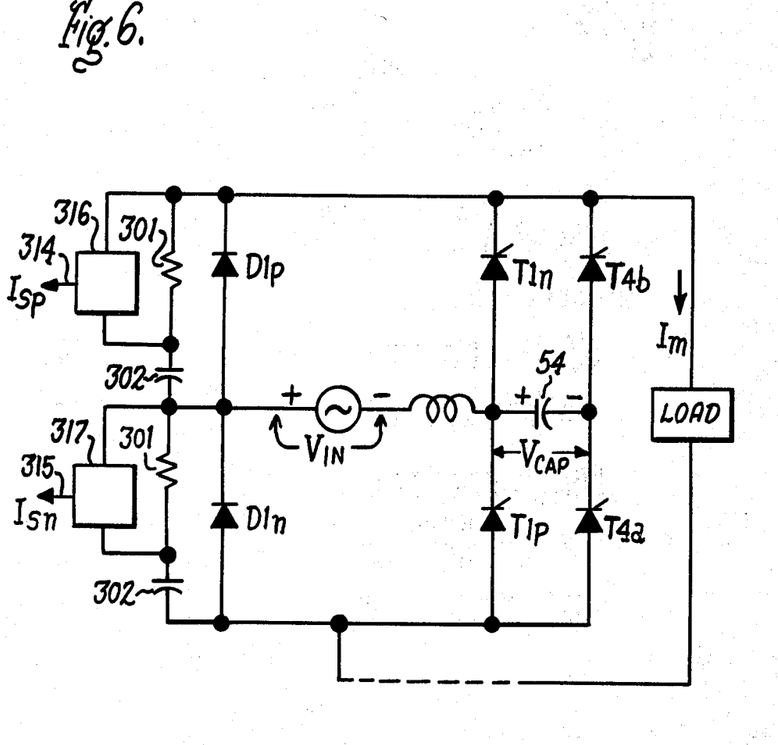
FIG. 6 is a simplified schematic circuit diagram of a forced commutated hybrid rectifying bridge.

FIG. 6 shows the basic components of a forced commutated hybrid rectifying bridge similar in construction to bridge 1 of the FIG. 1 converter, with the addition of conventional snubber circuits which in practice are respectively connected across the diodes D1p and D1n. Each snubber typically comprises a resistor 301 in series with a capacitor 302. The operation of this bridge will be summarized for the half cycle of its alternating voltage input having the polarity shown in FIG. 6. It is assumed that a relatively smooth direct current is already established in the traction motor load. This current initially freewheels through the diode leg of the bridge, as is indicated by trace $I_D$ in FIG. 7 prior to the time $t_o$ at which a firing signal is generated for turning on the main thyristor T1p. During the ensuing commutation interval ($t_o$-$t_1$), $I_D$ decreases to zero in diode D1n, and the recombination process in the PN junction of this diode then produces a significant reverse recovery current shown at 303 in FIG. 7. As the reverse recovery current subsequently decays to zero (at time $t_2$), the reverse voltage $V_D$ across the diode D1n rises to a peak 304 higher than the instantaneous magnitude of input voltage at that time. The snubber circuit 301, 302 is so designed that the peak reverse recovery voltage generated across the diode does not exceed a predetermined safe level.

Figure 7:
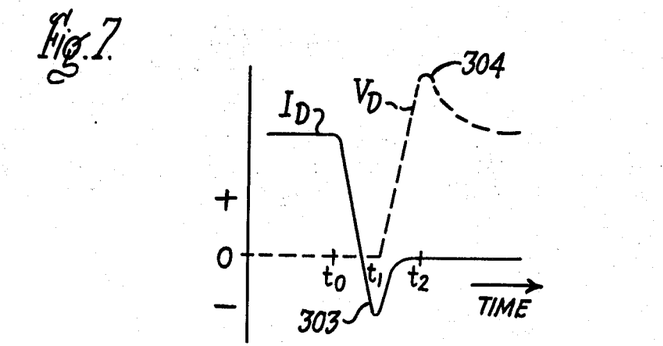
FIG. 7 is a chart illustrating how the diode voltage and current in the FIG. 6 bridge vary with time during a commutation interval.

So long as the amplitude of the input voltage is relatively low, as is true in the locomotive propulsion system disclosed in this application, the size and expense of the snubber resistor and capacitor for a given reverse recovery voltage are desirably small, and "slow recovery" diodes can be used without requiring additional magnetic devices (such as linear and saturable reactors) to keep the reverse voltage overshoot from exceeding a safe level. However, if the associated auxiliary controlled rectifier T4a were turned on by a β firing signal before the diode D1n has fully recovered its reverse blocking capability, the reverse voltage across the diode could prematurely rise to an excessively high magnitude because this voltage is then increased by the voltage on the commutating capacitor (which can be precharged to a voltage twice as high as the input voltage). In this event, diode current would decrease at a much faster rate than is shown in FIG. 7 and, unless additional reactors were connected in series with the diodes and the size (and cost) of the snubber components 301 and 302 were substantially increased, the resulting increase in the amplitude of the reverse recovery current 303 could lead to diode failure due to reverse recovery overvoltage. The most critical overvoltage condition would occur if the ignition and extinction angles were nearly 90° where the instantaneous magnitudes of both the input voltage and the capacitor voltage are at their respective maximums. The time delay circuit 235 solves the problem by preventing premature turn on of the auxiliary rectifiers T4a and T4b.

Figure 5A:
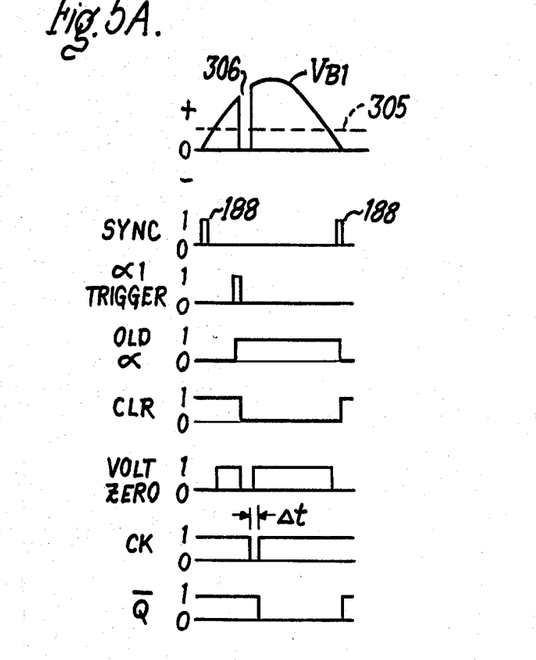
FIG. 5A is a time chart of various input and output signals of time delay means shown in FIG. 5 for temporarily blocking operation of the β logic circuit.

The presently preferred embodiment of the time delay circuit 235 has been shown in FIG. 5, and its operation can be more readily understood from FIG. 5A which illustrates the signal changes at the various inputs and output of this circuit during a typical half cycle of the alternating voltage VB1 applied to bridge 1. This embodiment comprises the combination of a D-type flip flop 236 and a "one shot" device 237. The signal on line 181 is supplied to the input of the one shot 237 and also, via an OR logic circuit 238, to the "D" input of the flip flop 236. The "Q" output of the flip flop is fed back through 238 to the D input. As can be seen in FIG. 5, the output of the device 237 is connected to the "clock" input of the flip flop 236 via a signal inverter 239 and a line 240. The one shot device 237 has a "clear" input which is connected to the line 226. In its quiescent state, this device has a low or 0 output and the signal on line 240 is 1. Assuming there is a 0 signal on line 226, each 0-to-1 change of the volt zero signal on line 181 activates or triggers the one shot which then produces a high or 1 output signal (inverted to a 0 signal on line 240) for a predetermined period of time (e.g., 300 microseconds). If there is a 1 signal on line 226, the one shot cannot be activated and its output will remain 0.

The output signal of the time delay circuit 235 is the "Q bar" output of the flip flop 236. It is shown by the bottom trace in FIG. 5A. This signal changes from 0 to 1 at each zero crossing of the alternating voltage (VB1) applied to bridge 1, as indicated by a sync pulse (188) on line 187 to which the "reset" input of 236 is connected, and it later changes from 1 to 0 whenever the signal (trace CK in FIG. 5A) on the clock input line 240 changes from 0 to 1 while a 1 signal is being applied to the D input of the flip flop. The signal (CK) on line 240 changes from 0 to 1 simultaneously with a 1-to-0 change at the output of the one shot 237. This occurs on the expiration of the aforesaid time period (Δt) after the one shot has been triggered in response to the signal (volt zero) on line 181 changing from 0 to 1 while the signal (CLR) on the line 226 is 0. There is a 0-to-1 change of the volt zero signal on line 181 each time VB1 rises above the aforesaid pick up level (shown at 305 in FIG.

5A) of the zero voltage detector 180 in the #1 generator 171, but such a change will not activate the one shot unless it occurs after the one shot device 199 in generator 171 produces an $\alpha_1$ trigger pulse, as indicated by the signal (old $\alpha$) on line 206 changing from 0 to 1 (which normally is inverted to a 1-to-0 change at the clear input of the one shot 237). Thus the instant at which the one shot 237 is actually triggered coincides with the end of a commutation interval when the load current transfer to the most recently turned on main thyristor T1$p$ or T1$n$ from the corresponding diode D1$n$ or D1$p$ is completed and VB1 rises above the pick up level 305 from its collapsed state during commutation (see notch 306 in FIG. 5A). As a result, there is a 1 signal on line 232 for an interval that commences with a zero crossing of the bridge 1 input voltage, that includes the commutation interval following each turn on of either one of the main thyristors in bridge 1, and that extends after the commutation interval for a fixed period of time (determined by the one shot device 237) sufficiently long to allow the reverse recovery current in the diode D1$n$ or D1$p$ to decay to zero.

Figure 5B:
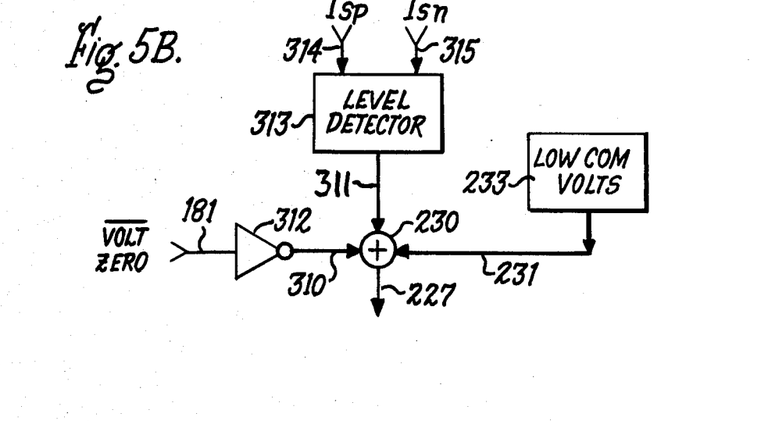
FIG. 5B is a functional block diagram of an alternative arrangement that can be substituted for the time delay means shown in FIG. 5.

An alternative embodiment of the invention is shown in FIG. 5B. Here the second input line (232) to the OR logic circuit 230 is replaced by two lines 310 and 311. Line 310 receives an inverted volt zero signal from line 181 to which it is coupled by a signal inverter 312, whereby this input to the circuit 230 is 1 throughout the commutation interval following each turn on of either one of the main thyristors in bridge 1 (i.e., the interval of the commutation notch 306 in VB1). Line 311 receives a signal from a level detector 313 having two input lines 314 and 315 which in turn receive current feedback signals Isp and Isn representative of the magnitude of current in the snubber circuits that are respectively connected across the diodes D1$p$ and D1$n$ in bridge 1. These current feedback signals can be derived, for example, by voltage monitors 316 and 317 connected across the snubber resistors 301 as is shown in FIG. 6. The level detector 313 shown in FIG. 5B is suitably constructed and arranged to provide a 1 signal on the input line 311 of logic circuit 230 only when the magnitude of current in either snubber equals or exceeds a predetermined low level. Whenever snubber current decays below this level, full recovery of the diode's reverse blocking capability is assured, and a 0 signal is then provided on line 311. It will now be appreciated that there are 1 signals on either line 310 or 311 (and hence a 0 signal on line 225 in FIG. 5) for an interval that commences in response to the turn on of a main thyristor in bridge 1, that extends through the ensuing commutation interval, and that expires when snubber current decays below the aforesaid low level.

In the manner described above, the time delay circuit 235 shown in FIG. 5 (or the alternative arrangement shown in FIG. 5B) is effective temporarily to maintain a 0 signal on line 225 following the turn on of a main thyristor during each half cycle of operation. This prevents the logic means 220 from passing to the input line 217 of the one shot 218 any 0-to-1 signal change on the output line 216 of the comparator 215. During each half cycle the one shot 218 will actually produce a $\beta$ trigger signal on line 175 in response to either the 0-to-1 change of the signal on line 216 or the 0-to-1 change of the signal on line 225, whichever occurs later. If $\alpha_1$ exceeds the desired $\beta$, the 0-to-1 change on line 225 is later, and consequently the $\beta$ trigger signal is produced by the one shot 218 immediately upon termination of the aforesaid interval during which there is a 1 signal on output line 232 of the time delay circuit 235. In this event the actual extinction angle is greater than desired. When $\beta$ exceeds $\alpha_1$ by a sufficient margin, the 0-to-1 change on line 216 is later and the $\beta$ trigger signal coincides with this change. In either case, the generation of firing signals for the auxiliary controlled rectifiers in the forced commutation subcircuit 4 of bridge 1 is properly coordinated with the generation of firing signals for the main thyristors in the same bridge.

The $\beta$ logic circuit includes means 247 responsive to the frequency of the $\beta$ trigger signals on line 175 for providing a signal $\beta$OK on line 70. The frequency responsive means 247 is suitably constructed and arranged so that $\beta$OK is 1 except when the one shot device 218 is operating normally in response to periodic 0-to-1 signal changes on line 217 to produce a train of $\beta$ trigger signals having a frequency higher than a predetermined magnitude (e.g., approximately 1.4 times the frequency of V1). The $\beta$OK signal on line 70 is supplied to clamping means in the firing reference generator 65 (FIG. 2) which, in a manner that is shown and described in the concurrently filed application of Chandran and Matulevich, is effective to limit the first reference signal on line 71 to a maximum value corresponding to a predetermined minimum ignition angle (e.g., 73°) whenever the $\beta$ logic circuit is not producing periodic trigger signals on its output line 175 and the magnitude of motor current is not lower than the predetermined level at which the signal IL on line 35 changes state.

While alternative forms of the invention have been shown and described by way of illustration, other modifications and variations thereof will probably occur to persons skilled in the art. It is therefore intended by the concluding claims to cover all such changes and modifications as fall within the true spirit and scope of this invention.

We claim:

1. Improved means for controlling an electric power converter used to supply direct current to an electric load circuit, said converter comprising the combination of an electric rectifying bridge having first and second legs connected in parallel with one another between a pair of d-c terminals, said first leg comprising at least one pair of serially connected diodes and said second leg comprising at least one pair of serially connected, alternately conducting controllable electric valves having cyclically operative valve turn off means respectively associated therewith, means connected between the juncture of said diodes in the first leg of said bridge and the juncture of said valves in the second leg of said bridge for applying alternating voltage from an a-c power source to said bridge, means for connecting the d-c terminals of said bridge to said load circuit, and control means for generating a set of firing signals to periodically turn on said valves in synchronism with said alternating voltage at an ignition angle that can be advanced or retarded as desired and for controlling said valve turn off means so that normally said valves are periodically turned off in synchronism with said alternating voltage at a desired extinction angle which varies within predetermined limits, wherein the improvement comprises valve turn on responsive means associated with said control means for temporarily blocking valve turn off operation thereof following each turn on of either one of said pair of valves in said second leg of said bridge until after the corresponding diode in said first leg of said bridge has fully recovered its reverse blocking capability.

2. The improvement of claim 1 wherein said valve turn off means is a forced commutation subcircuit comprising at least one pair of auxiliary controlled rectifiers connected in circuit with at least one commutating capacitor across the respective valves in said second leg of said rectifying bridge, whereby each of said valves in turn is forced to turn off upon turn on of a complementary one of said auxiliary rectifiers, and wherein said control means includes means operative to produce periodic trigger signals for turning on said auxiliary rectifiers.

3. The improvement of claim 1 or 2 wherein said valve turn on responsive means is effective to block valve turn off operation of said control means during each commutation interval when current is transferring to the most recently turned on valve from the corresponding diode and thereafter for a predetermined period of time.

4. The improvement of claim 3 wherein said valve turn on responsive means is also effective to block valve turn off operation of said control means during recurrent intervals commencing at each zero crossing of said alternating voltage and terminating in response to the next turn on of either one of said pair of valves.

5. The improvement of claim 4 wherein said valve turn on responsive means comprises bistable voltage detecting means connected between said diode juncture and said valve juncture, said detecting means being in a first state whenever there is negligible voltage between said junctures and otherwise being in a second state, and time delay means activated in response to said detecting means changing from said first state to said second state at the end of said commutation interval.

6. The improved converter control means of claim 1 or 2 for a converter in which the first leg of the rectifying bridge includes at least one pair of snubber circuits connected across the respective diodes in said first leg, wherein said valve turn on responsive means is effective to block valve turn off operation of said control means during each commutation interval when current is transferring to the most recently turned on valve from the corresponding diode and thereafter for a period of time that expires when the magnitude of current in the snubber circuit across said corresponding diode decays below a predetermined low level.

* * * * *